(12) United States Patent
Jensen

(10) Patent No.: US 12,184,121 B2
(45) Date of Patent: Dec. 31, 2024

(54) SUPPORT STRUCTURE AND SEGMENTED STATOR FOR AN ELECTRIC MACHINE, WIND TURBINE AND METHOD OF MANUFACTURING A SUPPORT STRUCTURE

(71) Applicant: Siemens Gamesa Renewable Energy A/S, Brande (DK)

(72) Inventor: Simon Vyff Jensen, Tørring (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 236 days.

(21) Appl. No.: 17/799,704

(22) PCT Filed: Jan. 13, 2021

(86) PCT No.: PCT/EP2021/050557
§ 371 (c)(1),
(2) Date: Aug. 15, 2022

(87) PCT Pub. No.: WO2021/170306
PCT Pub. Date: Sep. 2, 2021

(65) Prior Publication Data
US 2023/0081236 A1 Mar. 16, 2023

(30) Foreign Application Priority Data
Feb. 28, 2020 (EP) .................................. 20160089

(51) Int. Cl.
*H02K 1/18* (2006.01)
*F03D 80/00* (2016.01)
*H02K 7/18* (2006.01)

(52) U.S. Cl.
CPC ............ *H02K 1/187* (2013.01); *F03D 80/00* (2016.05); *H02K 7/183* (2013.01); *F05B 2220/706* (2013.01); *F05B 2240/10* (2013.01)

(58) Field of Classification Search
CPC ...... H02K 21/222; H02K 21/16; H02K 1/187; H02K 1/148; H02K 1/185
See application file for complete search history.

(56) References Cited

U.S. PATENT DOCUMENTS 7,772,738 B2 * 8/2010 Huppunen ............. H02K 1/185
310/91
7,923,890 B2 * 4/2011 Boardman, IV ....... H02K 1/185
310/431
(Continued)

FOREIGN PATENT DOCUMENTS

EP 3032703 A2 6/2016
EP 3252928 A1 12/2017
(Continued)

OTHER PUBLICATIONS

PCT International Search Report and Written Opinion of International Searching Authority mailed Apr. 21, 2021 corresponding to PCT International Application No. PCT/EP2021/050557 filed Jan. 13, 2021.

*Primary Examiner* — Leda T Pham
(74) *Attorney, Agent, or Firm* — Schmeiser, Olsen & Watts, LLP

(57) ABSTRACT

A support structure for supporting a lamination stack and a winding structure in order to form a stator segment for an electric machine, in particular a wind turbine generator including (a) a frame including two parallel end plates and two side plates, the side plates extending between corresponding end portions of the end plates, (b) a plurality of internal connecting members extending within the frame between the end plates, and (c) a plurality of external connecting members extending outside of the frame, each external connecting member forming an extension of a corresponding internal connecting member beyond one of the end plates, wherein (d) the internal and external con- (Continued)

necting members are adapted to engage with corresponding fastening members for securing a lamination stack. A stator segment, a wind turbine generator, and a method of manufacturing a support structure are also described.

9 Claims, 3 Drawing Sheets

(56) References Cited

U.S. PATENT DOCUMENTS

| | | | |
|---|---|---|---|
| 8,274,192 B2* | 9/2012 | Lokhandwalla | H02K 1/148 310/433 |
| 10,541,573 B2* | 1/2020 | Semken | H02K 15/125 |

FOREIGN PATENT DOCUMENTS

| | | | |
|---|---|---|---|
| EP | 3595147 A1 | 1/2020 |
| GB | 1114413 A | 5/1968 |
| WO | 2006008331 A1 | 1/2006 |

\* cited by examiner

SUPPORT STRUCTURE AND SEGMENTED STATOR FOR AN ELECTRIC MACHINE, WIND TURBINE AND METHOD OF MANUFACTURING A SUPPORT STRUCTURE

CROSS-REFERENCE TO RELATED APPLICATIONS

This application claims priority to PCT Application No. PCT/EP2021/050557, having a filing date of Jan. 13, 2021, which claims priority to EP Application No. 20160089.7, having a filing date of Feb. 28, 2020, the entire contents both of which are hereby incorporated by reference.

FIELD OF TECHNOLOGY

The following relates to the field of electric machines, more specifically to a support structure for supporting a lamination stack and a winding structure in order to form a stator segment for an electric machine, in particular a wind turbine generator, and to a method of manufacturing such a support structure. The following further relates to a stator and to a wind turbine comprising such a stator.

BACKGROUND

When designing segmented stators for large electric machines, such as wind turbine generators, many aspects and constraints have to be taken into consideration. In many cases it is not possible to utilize the maximum length of the stator due to boundary conditions from surrounding components and due to the design of the segment support structure itself. This causes a lower performance compared to what would theoretically be available. Hence, less torque with lower output power is the result. There is thus a desire for maximizing the torque output of the generator without adding significant costs to the generator. To utilize the maximum length of the stator, a significantly more complex segment support structure design would be required. However, this would increase the costs significantly.

Conventionally, the segment support structure is designed with simple machined pressure plates with an integrated finger plate in one end. The electrical lamination steel is stacked, in packages, from the integrated finger plate to the other end of the support structure. The lamination is enclosed in the support structure by either bolting or welding on a finger plate in the open end of the support structure. However, this provides a number of boundary conditions for the length of the electrical steel, as the support structure is enclosing the lamination stack within the width of the support structure.

Hence, there may be a need for a way of flexibly increasing the effective size of the stator without adding complexity and corresponding costs.

SUMMARY

According to a first aspect of embodiments of the invention there is provided a support structure for supporting a lamination stack and a winding structure in order to form a stator segment for an electric machine, in particular a wind turbine generator. The support structure comprises (a) a frame comprising two parallel end plates and two side plates, the side plates extending between corresponding end portions of the end plates, (b) a plurality of internal connecting members extending within the frame between the end plates, and (c) a plurality of external connecting members extending outside of the frame, each external connecting member forming an extension of a corresponding internal connecting member beyond one of the end plates, wherein (d) the internal and external connecting members are adapted to engage with corresponding fastening members for securing a lamination stack.

This aspect of embodiments of the invention is based on the idea that the effective length of the support structure is extended beyond the length of the frame by adding external connecting members extending outside of the frame in such a way that they extend the internal connecting members within the frame and thereby add to the total length of the connecting members. Thereby, a larger lamination stack can be supported by the resulting support structure. The amount of extension can be chosen in view of the space available and thus allows a relatively simple optimization of the resulting generator.

According to an embodiment of the invention, the external connecting members have a u-shaped cross section.

The u-shape is advantageous as the legs of the profile provides strength and can be secured to the corresponding end plate while the bottom (or top, depending on the orientation) can be used to engage with the fastening members for securing the lamination stack.

According to a further embodiment of the invention, the u-shaped cross section has a height that decreases with increasing distance away from the corresponding end plate.

In other words, the legs of the profile have maximum length at the corresponding end plate and get shorter with increasing distance away from the end plate. This shape assures that a robust connection with the end plate is possible while less space is occupied in the region outside of the frame.

According to a further embodiment of the invention, the external connecting members extending from one of the end plates have a first length and the external connecting members extending from the other one of the end plates have a second length.

In other words, the length of the extensions from one end plate may be different from or equal to the length of the extensions from the other end plate. While a symmetric structure (with equal first and second lengths) may in many cases be preferable, the flexibility provided by embodiments of the present invention to have different lengths of extensions may be very useful in some cases, e.g. in order to leave enough space at one end of the stator to other structural components.

According to a further embodiment of the invention, the first length and the second length are between 5% and 25%, such as around 15%, of the length of the lamination stack.

According to a further embodiment of the invention, each of the internal connecting members and external connecting members comprises a plurality of holes for allowing a bolt connection with the corresponding fastening members.

The fastening members may be integrated in the lamination stack material or they may be separate (i.e. intermediate) parts that are also connected to the lamination stack. One example of a separate part is a rod shaped to fit into a corresponding recess in the lamination stack in order to form a dovetail connection between the support structure and the lamination stack. Fastening members that are integrated in the lamination stack may simply be sections of the lamination material that are to be welded to the connecting members. Alternatively, the integrated fastening members may be a fastening structure formed to receive a bolt or some other kind of fastening element.

According to a further embodiment of the invention, the end plates have an arc-like shape.

The arc-like shape assures that several segments can be arranged side by side to form a round stator.

According to a further embodiment of the invention, at least one of the end plates is adapted to be connected to a finger plate via a finger plate connecting structure.

A finished stator segment may have a finger plate at both ends of the structure, each finger plate forming a boundary for the lamination stack. The finger plate connecting structure is particularly useful to a finger plate once the lamination stack has been formed (on top of another previously installed finger plate).

According to a further embodiment of the invention, the end plate comprises a plurality of holes, and the finger plate connecting structure comprises a plurality of cylindrical spacers and a plurality of bolts.

The cylindrical spacers have substantially the same length as the external connecting members. More specifically, the cylindrical spacers may be slightly shorter than the external connecting members, or they may have the same length as the external connecting members. It should be noted that the length of the spacers must not exceed the length of the external connecting members. Hence, the finger plate can be arranged and secured at the end of the external connecting members by pushing each bolt through a hole in the end plate and further through a cylindrical spacer and into a threaded hole in the finger plate. Alternatively, the finger plate may comprise unthreaded holes. In this case, nuts may be used to fasten the bolts.

According to a further embodiment of the invention, each of the two side plates comprises side connecting members for mechanically connecting the support structure with a neighboring support structure.

The side connecting members may in particular utilize bolts and nuts to mechanically connect the support structures of neighboring segments.

According to a second aspect of embodiments of the invention, there is provided a stator for an electric machine, in particular a wind turbine generator, the stator comprising a plurality of interconnected stator segments, wherein each stator segment comprises a support structure according to the first aspect or any of the above embodiments, a lamination stack and a winding structure.

This aspect of embodiments of the invention is generally based on the same idea as the first aspect and utilizes the advantages described above to provide a larger and more effective stator without significantly increasing costs.

According to a third aspect of embodiments of the invention, there is provided a wind turbine comprising a stator according to the second aspect.

Compared to a similar wind turbine without extended stator, the wind turbine according to this aspect will be able to produce a significantly larger amount of power during its lifetime without being significantly more expensive to produce.

According to a fourth aspect of embodiments of the invention, there is provided a method of manufacturing a support structure for supporting a lamination stack and a winding structure in order to form a stator segment for an electric machine, in particular a wind turbine generator. The described method comprises (a) providing a frame comprising two parallel end plates and two side plates, the side plates extending between corresponding end portions of the end plates, (b) providing a plurality of internal connecting members extending within the frame between the end plates, and (c) providing a plurality of external connecting members extending outside of the frame, each external connecting member forming an extension of a corresponding internal connecting member beyond one of the end plates, wherein (d) the internal and external connecting members are adapted to engage with corresponding fastening members for securing a lamination stack.

This aspect of embodiments of the invention is based on essentially the same idea as the first aspect described above.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention are not limited to the described exemplary embodiments.

BRIEF DESCRIPTION

Some of the embodiments will be described in detail, with reference to the following figures, wherein like designations denote like members, wherein.

DETAILED DESCRIPTION

Figure 1:
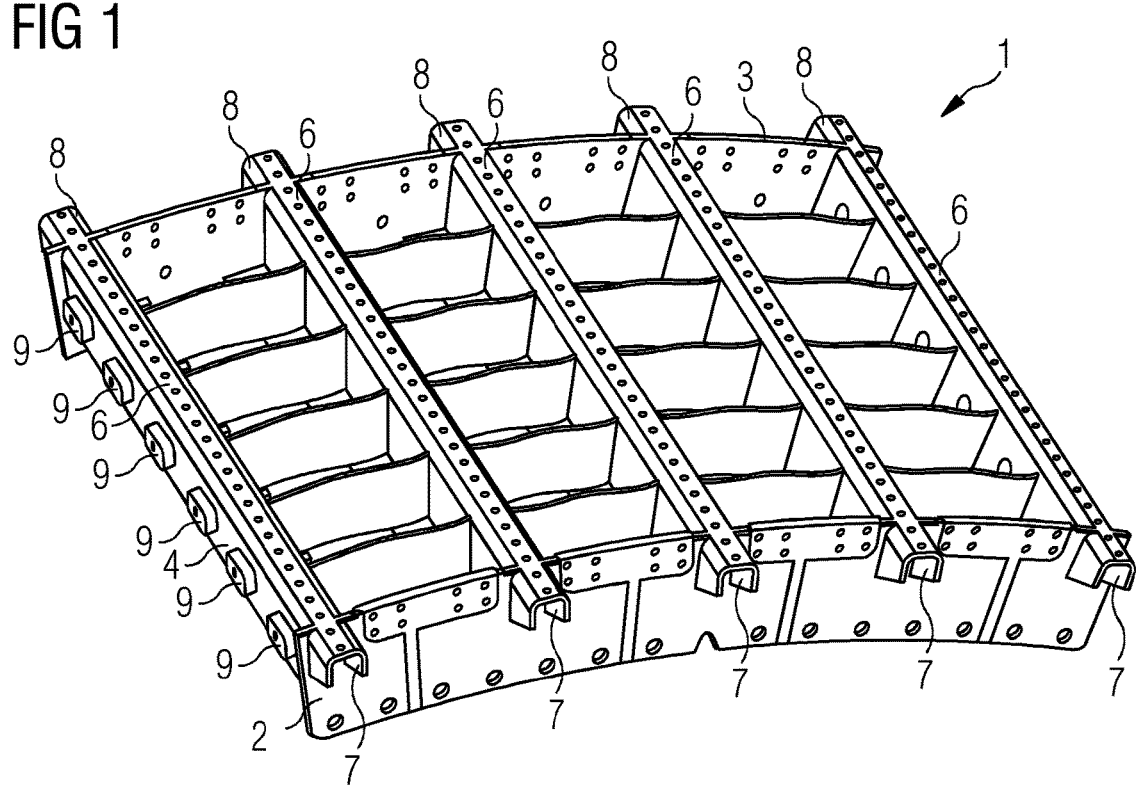
FIG. 1 shows a perspective view of a support structure according to an embodiment of the present invention.

The illustration in the drawing is schematic. It is noted that in different figures, similar or identical elements are provided with the same reference numerals or with reference numerals which differ only within the first digit.

Figure 2:
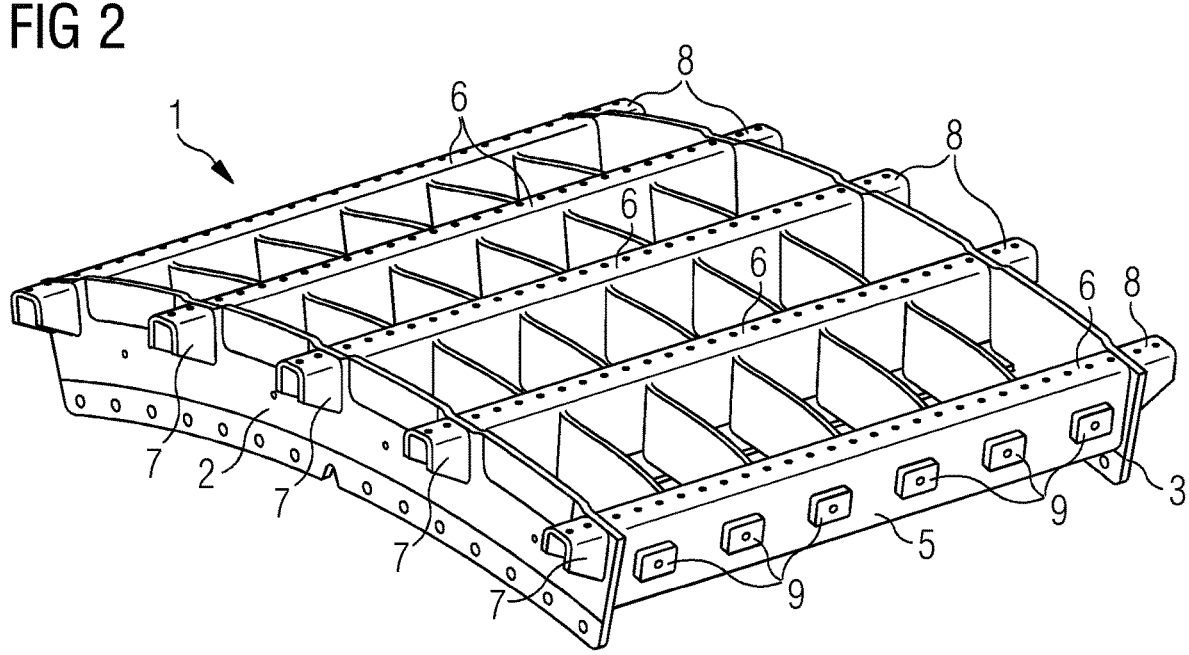
FIG. 2 shows a further perspective view of the support structure shown in FIG. 1.
Figure 3:
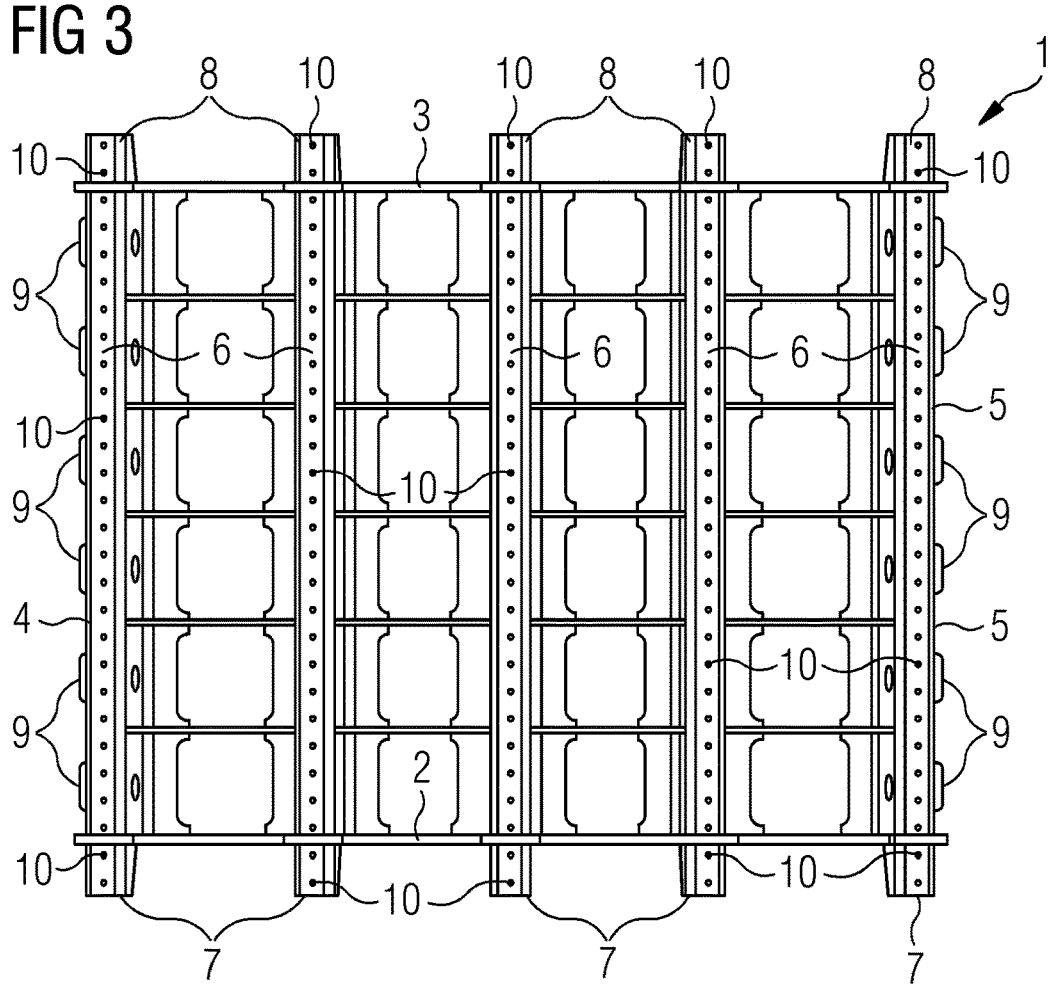
FIG. 3 shows a top view of the support structure shown in FIGS. 1 and 2.

FIGS. 1-3 show different views of a support structure 1 according to an embodiment of the present invention. More specifically, FIG. 1 shows one perspective view of the support structure 1, FIG. 2 shows another perspective view of the support structure 1, and FIG. 3 shows a top view of the support structure 1. The support structure 1 is particularly suitable for supporting a lamination stack and a winding structure in order to form a stator segment for an electric machine, in particular a wind turbine generator.

The support structure 1 comprises two parallel end plates 2, 3 and two side plates 4, 5 extending between corresponding end portions of the end plates 2, 3, thereby forming a substantially rectangular frame. The end plates 2, 3 have an arc-like shape such that the support structure 1 can be combined with several similar structures to form an annular stator structure around an axis of rotation, the axis of rotation being parallel to the side plates 4, 5. To allow such connections with neighboring structures, each side plate 4, 5 comprises a plurality of side connecting members 9 for bolting the segments together.

A plurality of internal connecting members 6 extend within the frame between the end plates 2, 3. In the specific embodiment shown, there are five internal connecting members 6 but the skilled person will appreciate that any other number of internal connecting elements 6 is possible, such as two, three, four, six, seven or more.

Furthermore, a plurality of external connecting members 7, 8 extends outside of the frame. Each external connecting member 7, 8 forms an extension of a corresponding internal connecting member 6 beyond one of the end plates. More specifically, external connecting members 7 extend away from end plate 2 while external connecting members 8 extend away from end plate 3. Thereby, a corresponding number (in the present exemplary embodiment five) of combined connecting members are formed, each constituted by one internal connecting member 6, one external connecting member 7 at the side of end plate 2, and one external connecting member 8 at the side of end plate 3. Hence, the total length of each combined connecting member exceeds the length of the frame by the length of the two external connecting members 7, 8. In this exemplary embodiment, the length of external connecting members 7 is substantially equal to the length of external connecting members 8. However, in other exemplary embodiments of the present invention the length of external connecting members 7 may differ from the length of external connecting members 8.

The internal 6 and external 7, 8 connecting members are configured to engage with corresponding fastening members (not shown) for securing a lamination stack on top of the support structure 1. As shown, particularly in FIG. 3, this is achieved in the present embodiment by providing both the internal connecting members 6 and the external connecting members 7, 8 with an elongate flat surface facing toward the lamination material (not shown), in which surface a plurality of holes 10 is provided. The holes 10 allow bolts or other fastening elements to extend through the surface and into fastening members of a lamination stack, such as a rod forming a dovetail connection with the lamination stack.

The external connecting members 7, 8 have a u-shaped profile or cross-sectional shape, where the aforementioned surface with holes 10 constitutes the bottom of the u-shape. As shown in FIG. 1 and FIG. 2, the legs of the u-shape are longer in the vicinity of the end plates 2, 3 and gets shorter with increasing distance away from the end plates 2, 3. Thereby, the required strength and stability is provided with a minimum of material while leaving as much space as possible for other parts, such as windings, busbars, etc.

Figure 4:
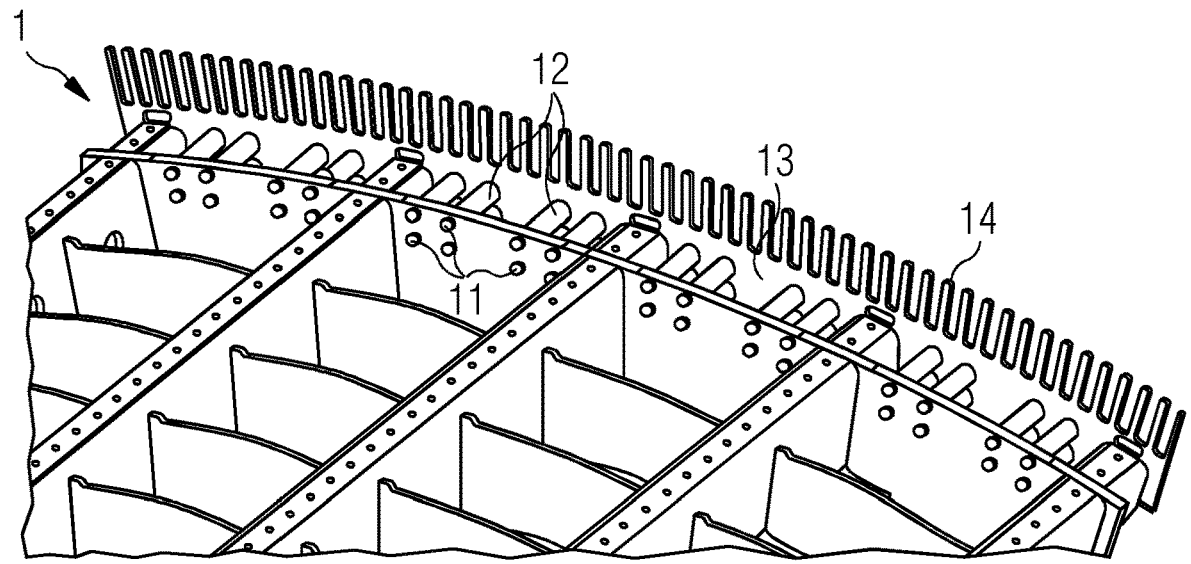
FIG. 4 shows a partial view of a support structure with a finger plate according to an embodiment of the present invention.

FIG. 4 shows a partial view of support structure 1 with a finger plate 13 according to an embodiment of the present invention. The finger plate 13 forms a border for the (to be mounted) lamination stack and comprises a plurality of teeth or fingers 14 that allow a winding structure to extend in and out of the lamination stack. The finger plate 13 displaced from the end plate by an amount corresponding to the length of the external connecting members. In the present exemplary embodiment this is achieved by arranging a plurality of cylindrical hollow spacers 12 and bolts 11 extending from the inner side of the end plate through the spacers 12 and into the finger plate 13 where it is fastened either by a thread in the finger plate 13 or by a nut on the outside of the finger plate 13.

Figure 5:
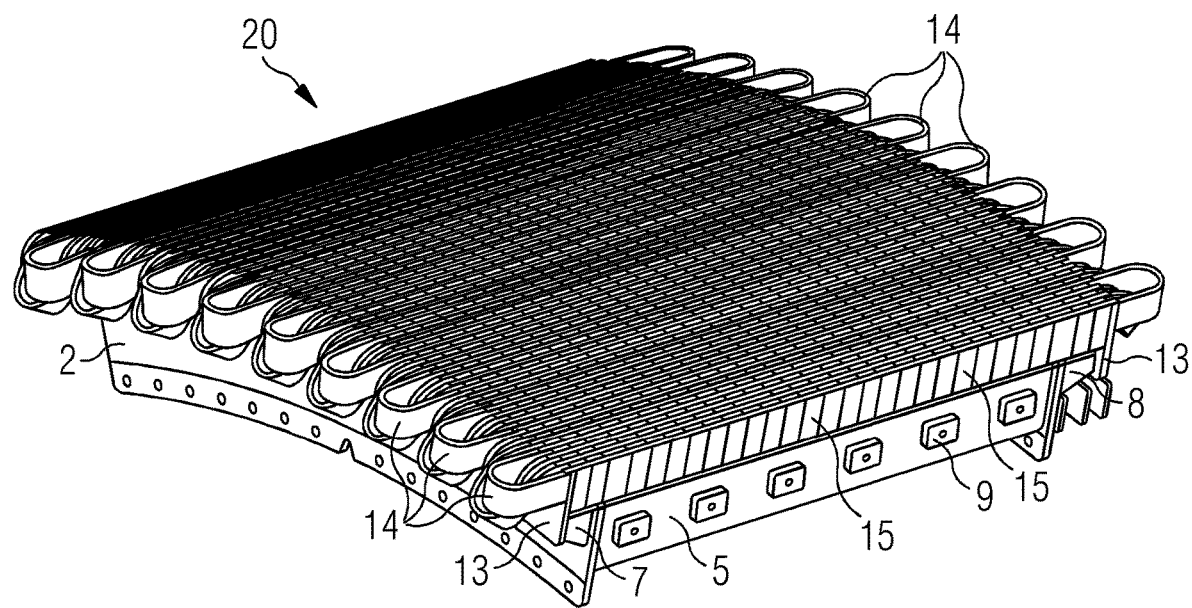
FIG. 5 shows a stator segment according to an embodiment of the present invention.

FIG. 5 shows a stator segment 20 according to an embodiment of the present invention. The stator segment 20 comprises a support structure as the one discussed above and a lamination stack constituted by a plurality of lamination packets 15 arranged between finger plates 13 and fastened to the internal and external fastening members 6, 7, 8 of the support structure 1. A winding structure 14 is arranged within the lamination stack.

As can be seen, the length of the lamination stack 15 exceeds the length between the end plates 2 and 3 by an amount corresponding to the lengths of external fastening members 7, 8. Hence, it is possible to maximize the length of the lamination stack 15 in a flexible manner by adding the external connecting members 7, 8 with lengths that fit the remaining generator design and constraints but without changing the basic frame constituted by end plates 2, 3 and side plates 4, 5. In this way, the maximum torque of the generator can be optimized in a flexible manner. Looking at a lifetime of e.g., twenty years, this optimization can accumulate to a significant amount of power production.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A support structure for supporting a lamination stack and a winding structure to form a stator segment for an electric machine, the support structure comprising:
    a frame comprising two parallel end plates and two side plates, the side plates extending between corresponding end portions of the end plates, wherein at least one of the end plates is connected to a finger plate laterally spaced therefrom via a finger plate connecting structure, wherein the at least one of the end plates comprises a plurality of holes, and wherein the finger plate connecting structure comprises a plurality of hollow cylindrical spacers receiving a plurality of bolts extending between the finger plate and the at least one of the end plates,
    a plurality of internal connecting members extending within the frame between the end plates, and
    a plurality of external connecting members extending outside of the frame, each external connecting member forming an extension of a corresponding internal connecting member beyond the at least one of the end plates, wherein the plurality of external connecting members each have a u-shaped cross section, wherein each of the u-shaped cross sections has a height that decreases with increasing distance away from the at least one of the end plates, and
    wherein the internal and external connecting members are adapted to engage with corresponding fastening members for securing a lamination stack.

2. The support structure according to claim 1, wherein the external connecting members extending from one of the end plates have a first length and the external connecting members extending from the other one of the end plates have a second length.

3. The support structure according to claim 2, wherein the first length and the second length are between 5% and 25% of the length of the lamination stack.

4. The support structure according to claim 1, wherein each of the internal connecting members and external connecting members comprises a plurality of holes for allowing a bolt connection with the corresponding fastening members.

5. The support structure according to claim 1, wherein the end plates have an arc-like shape.

6. The support structure according to claim 1, wherein each of the two side plates comprises side connecting members for mechanically connecting the support structure with a neighboring support structure.

7. A stator for a wind turbine generator, the stator comprising a plurality of interconnected stator segments, wherein each stator segment comprises the support structure according to claim 1, a lamination stack and a winding structure.

8. A wind turbine comprising the stator according to claim 7.

9. A method of manufacturing a support structure for supporting a lamination stack and a winding structure in order to form a stator segment for an electric machine, the method comprising providing a frame comprising two parallel end plates and two side plates, the side plates extending between corresponding end portions of the end plates, wherein at least one of the end plates is connected to a finger plate laterally spaced therefrom via a finger plate connecting structure, wherein the at least one of the end plates comprises a plurality of holes, and wherein the finger plate connecting structure comprises a plurality of hollow cylindrical spacers receiving a plurality of bolts extending between the finger plate and the at least one of the end plates, providing a plurality of internal connecting members extending within the frame between the end plates, and providing a plurality of external connecting members extending outside of the frame, each external connecting member forming an extension of a corresponding internal connecting member beyond the at least one of the end plates, wherein the plurality of external connecting members each have a u-shaped cross section, wherein each of the u-shaped cross sections has a height that decreases with increasing distance away from the at least one of the end plates, and wherein the internal and external connecting members are adapted to engage with corresponding fastening members for securing a lamination stack.

* * * * *